US011499578B2

(12) United States Patent
Aerts et al.

(10) Patent No.: US 11,499,578 B2
(45) Date of Patent: Nov. 15, 2022

(54) FIBER OPTIC ENCLOSURE WITH RETENTION CLIP FOR SECURING A PERIMETER SEAL

(71) Applicant: COMMSCOPE CONNECTIVITY BELGIUM BVBA, Kessel-Lo (BE)

(72) Inventors: Maarten Aerts, Kessel-Lo (BE); Olivier C. Roche, Schaerbeek (BE); Christiaan Radelet, Aarschot (BE); Joren Schurmans, Kortenaken (BE)

(73) Assignee: COMMSCOPE CONNECTIVITY BELGIUM BVBA, Kessel-Lo (BE)

( * ) Notice: Subject to any disclaimer, the term of this patent is extended or adjusted under 35 U.S.C. 154(b) by 76 days.

(21) Appl. No.: 16/962,790

(22) PCT Filed: Jan. 14, 2019

(86) PCT No.: PCT/EP2019/050842
§ 371 (c)(1),
(2) Date: Jul. 16, 2020

(87) PCT Pub. No.: WO2019/141637
PCT Pub. Date: Jul. 25, 2019

(65) Prior Publication Data
US 2020/0355206 A1    Nov. 12, 2020

Related U.S. Application Data

(60) Provisional application No. 62/665,284, filed on May 1, 2018, provisional application No. 62/618,514, filed on Jan. 17, 2018.

(51) Int. Cl.
*F16B 2/24* (2006.01)
*F16J 15/06* (2006.01)
*G02B 6/44* (2006.01)

(52) U.S. Cl.
CPC ............... *F16B 2/24* (2013.01); *F16J 15/061* (2013.01); *G02B 6/4447* (2013.01)

(58) Field of Classification Search
CPC .......... F16B 2/24; F16J 15/061; G02B 6/4447
See application file for complete search history.

(56) References Cited

U.S. PATENT DOCUMENTS 2,219,382 A    10/1940  Conlon
3,673,643 A     7/1972  Kindell
(Continued)

FOREIGN PATENT DOCUMENTS

GB         838 935 A       6/1960
WO    2017/046185 A2       3/2017

OTHER PUBLICATIONS

International Search Report and Written Opinion of the International Searching Authority for International Patent Application No. PCT/EP2019/050842 dated Apr. 25, 2019, 15 pages.
(Continued)

*Primary Examiner* — David M Upchurch
(74) *Attorney, Agent, or Firm* — Merchant & Gould P.C.

(57) ABSTRACT

One or more seal retention clips can be used to retain a perimeter seal within a perimeter groove defined by a fiber optic enclosure housing. Certain types of seal retention clips can include portions that embed or bite into the housing of the enclosure, and/or embed or bite into the perimeter seal. In certain examples, the seal retention clip includes tabs or teeth that assist in engaging the housing and the perimeter seal. In certain examples, the seal retention clip defines a channel for receiving the perimeter seal.

26 Claims, 14 Drawing Sheets

(56) References Cited

U.S. PATENT DOCUMENTS

| | | | |
|---|---|---|---|
| 9,470,867 B1 | 10/2016 | James et al. | |
| 2013/0315551 A1* | 11/2013 | Claessens | G02B 6/4429 |
| | | | 385/136 |
| 2014/0226945 A1* | 8/2014 | Claessens | G02B 6/4457 |
| | | | 385/135 |
| 2017/0052338 A1 | 2/2017 | Claessens et al. | |
| 2020/0355206 A1* | 11/2020 | Aerts | F16J 15/061 |

OTHER PUBLICATIONS

MJC Mechanical Joint Closure, Tyco Electronics Raychem NV, 2 pages (Feb. 2006).

* cited by examiner

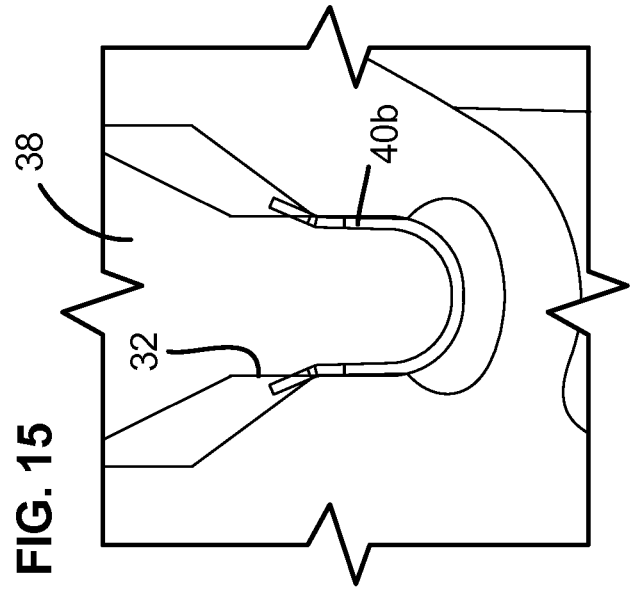
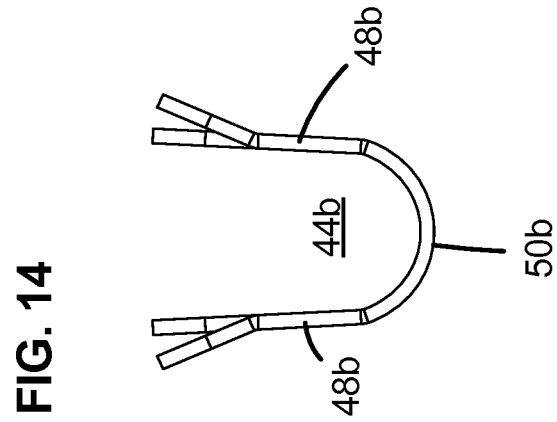

FIBER OPTIC ENCLOSURE WITH RETENTION CLIP FOR SECURING A PERIMETER SEAL

CROSS-REFERENCE TO RELATED APPLICATIONS

This application is a National Stage Application of PCT/EP2019/050842, filed on Jan. 14, 2019, which claims the benefit of U.S. Patent Application Ser. No. 62/618,514, filed on Jan. 17, 2018, and claims the benefit of U.S. Patent Application Ser. No. 62/665,284, filed on May 1, 2018, the disclosures of which are incorporated herein by reference in their entireties. To the extent appropriate, a claim of priority is made to each of the above disclosed applications.

TECHNICAL FIELD

The present disclosure relates generally to fiber optic enclosures that are re-enterable and that are sealed by perimeter seals.

BACKGROUND

Telecommunications systems typically employ a network of telecommunications cables capable of transmitting large volumes of data and voice signals over relatively long distances. The telecommunications cables can include fiber optic cables, electrical cables or combinations of electrical and fiber optic cables. A typical telecommunications network also includes a plurality of telecommunications enclosures integrated throughout the network of telecommunications cables. The telecommunications enclosures are adapted to house and protect telecommunications components such as splices, termination panels, power splitters, and wavelength division multiplexors. It is often preferred for the telecommunications enclosures to be re-enterable. The term "re-enterable" means that the telecommunications enclosures can be reopened to allow access to the telecommunications components housed therein without requiring the removal and destruction of the telecommunications enclosures. For example, certain telecommunications enclosures can include separate access panels that can be opened to access the interiors of the enclosures, and then closed to re-seal the enclosures. Other telecommunications enclosures take the form of elongated sleeves formed by wrap-around covers or half-shells having longitudinal edges that are joined by clamps or other retainers. Still other telecommunications enclosures include two half-pieces that are joined together by clamps, wedges, or other structures. Telecommunications enclosures are typically sealed to inhibit the intrusion of moisture or other contaminants.

SUMMARY

When a re-enterable enclosure is open, it is undesirable for a perimeter seal of the enclosure to become disengaged from the enclosure for numerous reasons. For example, once the perimeter seal has become disengaged from the enclosure, it can become lost or can fall onto the ground—and thereby become contaminated—compromising its ability to seal. Furthermore, once a perimeter seal has become disengaged from the housing, it may be improperly re-installed at a later date. Aspects of the present disclosure relate to methods and devices for preventing perimeter seals from disengaging from their corresponding housing pieces. In certain examples, one or more seal retention clips can be used to retain a perimeter seal within a perimeter groove defined by a fiber optic enclosure housing. In certain examples, the seal retention clip can include portions that embed or bite into the housing of the enclosure, and also embed or bite into the perimeter seal. In certain examples, the seal retention clip can have metal construction. In certain examples, the seal retention clip can define a channel for receiving the perimeter seal. In certain examples, the seal retention clip can include tabs or teeth that assist in engaging the housing and the perimeter seal.

Another aspect of the present disclosure relates to a telecommunications enclosure including a housing having a first shell and a second shell that meet together to enclose an interior of the housing. The housing defines a seal containment channel that extends along a perimeter of the housing. The seal containment channel is defined by a first groove defined by the first shell and a second groove defined by the second shell. The first and second grooves oppose each other when the first and second shells are mated together. The telecommunications enclosure also includes a cable seal that mounts between the first and second shells, and a perimeter seal that mounts within the seal containment channel for sealing between the first and second housing pieces. The telecommunications enclosure further includes fastening elements for securing the first and second shells together, and a seal retention clip that mounts within at least the first groove for retaining the perimeter seal within the first groove when the first and second shells are separated from one another to open the housing.

A variety of additional aspects will be set forth in the description that follows. Inventive aspects can relate to individual features and to combinations of features. It is to be understood that both the forgoing general description and the following detailed description are exemplary and explanatory only and are not restrictive of the broad inventions and inventive concepts upon which the examples disclosed herein are based.

BRIEF DESCRIPTION OF THE DRAWINGS

FIG. 14 is an end view of the seal retention clip of FIG. 12;

FIG. 15 shows the seal retention clip of FIG. 12 being used to secure a perimeter seal within a perimeter groove of a telecommunications enclosure;

DETAILED DESCRIPTION

Figure 1:
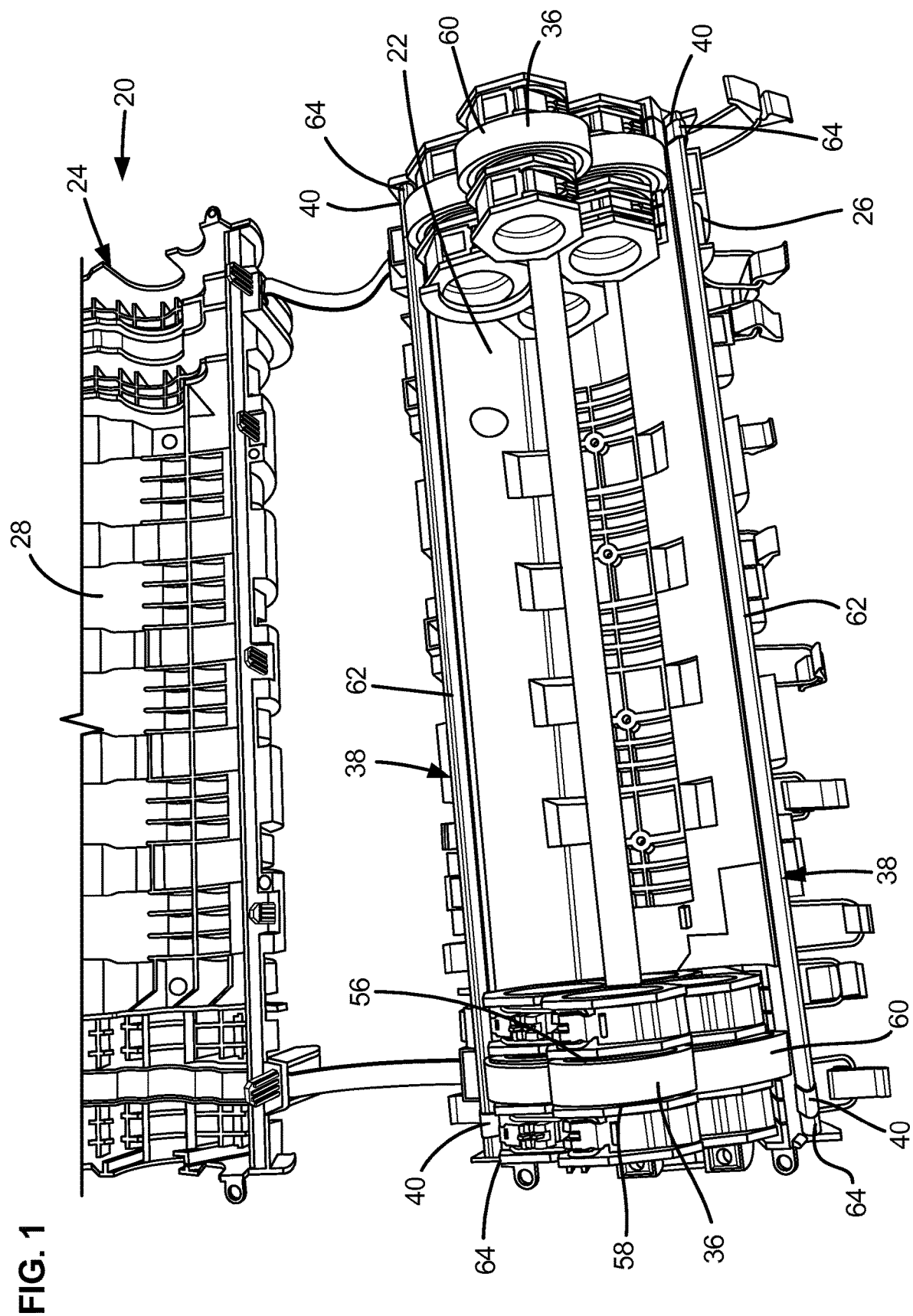
FIG. 1 shows a fiber optic enclosure in accordance with the principles of the present disclosure.

FIG. 1 depicts a fiber optic enclosure 20 (i.e., a telecommunications enclosure) in accordance with the principles of the present disclosure. The fiber optic enclosure 20 is shown in an open configuration in which an interior 22 of the fiber optic enclosure 20 is accessible for accessing components such as splices, optical fibers, optical power splitters, fiber optic adapters, wavelength division multiplexors, or other components. The fiber optic enclosure 20 includes a housing 24 including a first shell 26 and a second shell 28 that mate together to enclose the interior 22 of the housing 24. The housing 24 defines a seal containment chamber 30 (see FIG. 11) that extends along a perimeter of the housing 24. The seal containment chamber 30 is defined by first grooves 32 defined by the first shell 26 and second grooves 34 defined by the second shell 28. The first grooves 32 and the second grooves 34 oppose one another when the first and second shells 26, 28 are mated together. The fiber optic enclosure 20 also includes cable seals 36 that mount between the first and second shells 26, 28 and function to seal opposite ends of the housing 24. The cable seals 36 can define ports for receiving cables which enter the interior 22 of the housing 24. In certain examples, cable seals 36 can include a gel composition providing sealing about the cables. In certain examples, actuators such as spring-type actuators can be used to pressurize the cable seals 36 about the fiber optic cables to provide effective sealing.

Referring still to FIG. 1, the fiber optic enclosure 20 further includes perimeter seals 38 that mount within the seal containment chambers 30 for sealing between the first and second shells 26, 28. Perimeter seals 38 are shown as straight seals 38 that extend lengthwise along the housing 24 between the opposite ends at which the cable seals 36 are located. The perimeter seals 38 are generally parallel with each shown mounted within the first grooves 32 of the first shell 26. When the second shell 28 is mounted to the first shell 26, first portions of the perimeter seals 38 are positioned within the first grooves 32 and second portions of the perimeter seals 38 are positioned within the second grooves 34. The fiber optic enclosure 20 further includes fastening elements for securing the first and second shells 26, 38 together and for compressing the perimeter seals 38. In certain examples, fastening elements can include clips, clamps, wedges, latches, or other structures.

Referring still to FIG. 1, the fiber optic enclosure 20 further includes seal retention clips 40 that mount within at least the first grooves 32 for retaining the perimeter seals 38 within the first grooves 32 when the first and second shells 26, 28 are separated from one another to open the housing 24.

Figure 2:
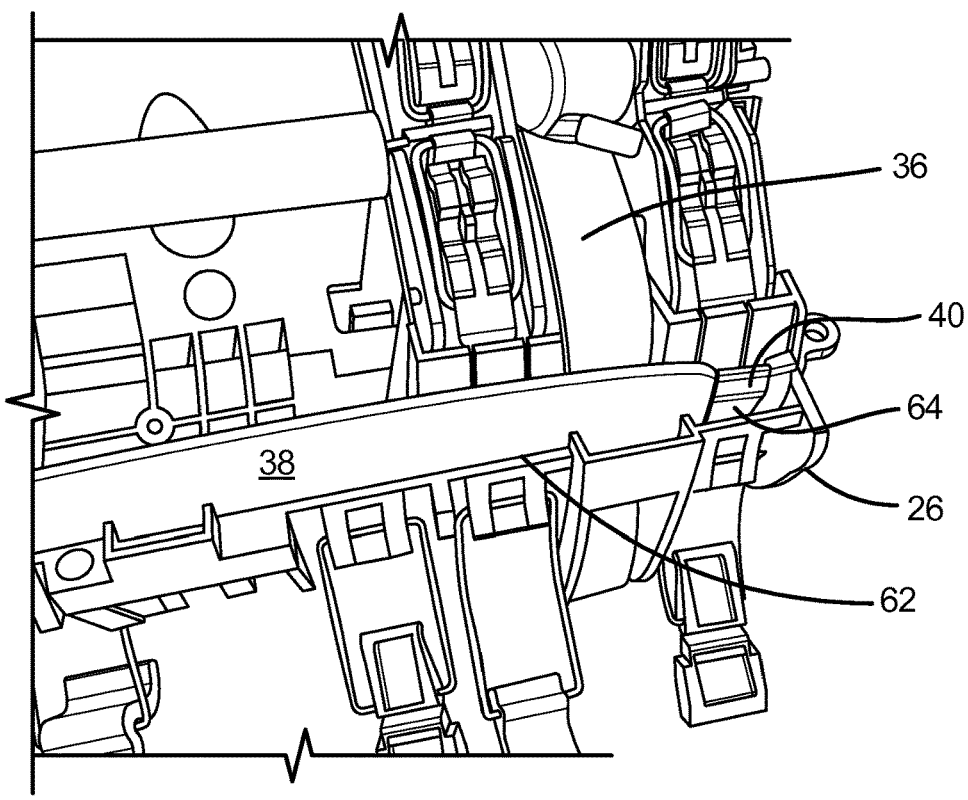
FIG. 2 is an enlarged view of a portion of FIG. 1 showing a seal retention clip for retaining a perimeter seal within a groove defined by one of the shells of the fiber optic enclosure.

FIG. 2 is an enlarged view showing one of the seal retention clips 40 positioned within one of the first grooves 32. The seal retention clip 40 is shown mounted over one of the perimeter seals 38. Preferably, seal retention clip 40 includes structure that bites into the portion of the first shell 26 defining the first groove 32 to retain the retention clip 40 and the corresponding perimeter seal 38 within the first groove 32. The seal retention clip 40 also may include structure that bites into the corresponding perimeter seal 38.

Figure 3:
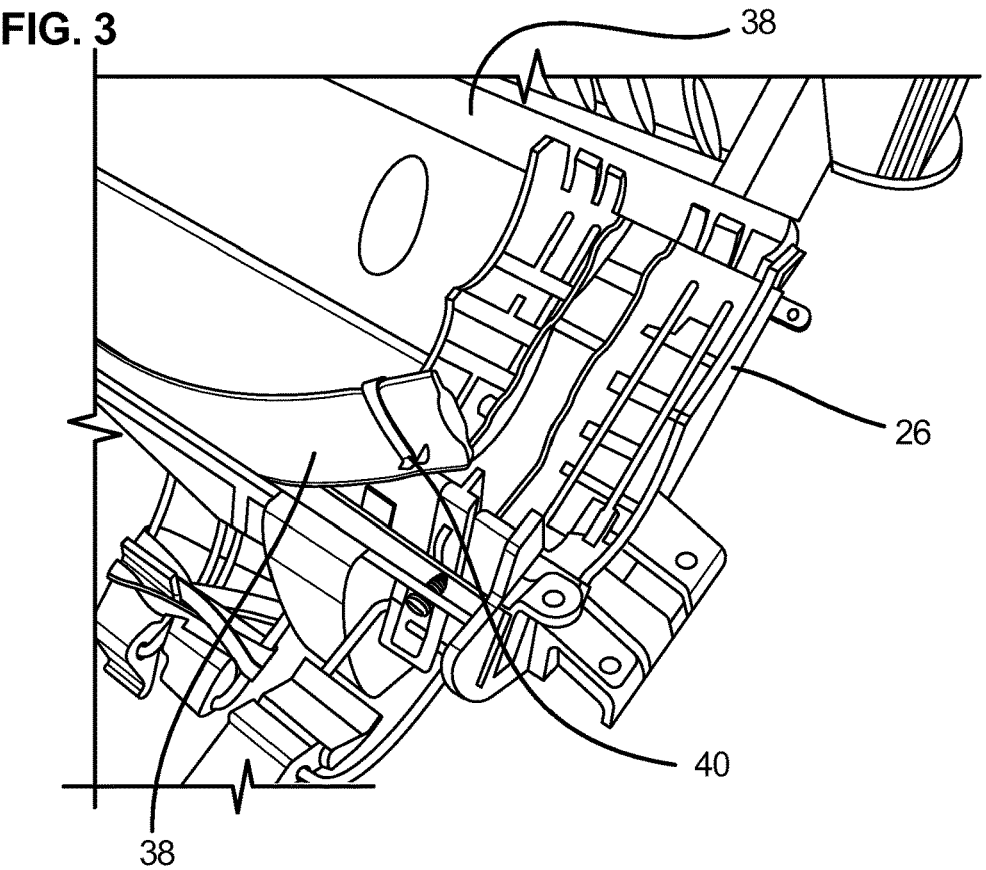
FIG. 3 shows the seal retention clip of FIG. 2 mounted on the perimeter seal of the fiber optic enclosure with the seal retention clip removed from the seal receiving groove of the fiber optic enclosure.

FIG. 3 shows the seal retention clip 40 of FIG. 2 removed from the first groove 32. The seal retention clip 40 includes teeth 42 (FIG. 4) that are pointed and embed into the first shell 26 when the seal retention clip 40 is pressed into the first groove 32. The seal retention clip 40 also defines a seal retention channel 44 in which the perimeter seal 38 is positioned. In a preferred example, the seal retention clip 40 has a metal construction. In the preferred example, the seal retention clip 40 has a resilient construction with elastic memory.

Figure 4:
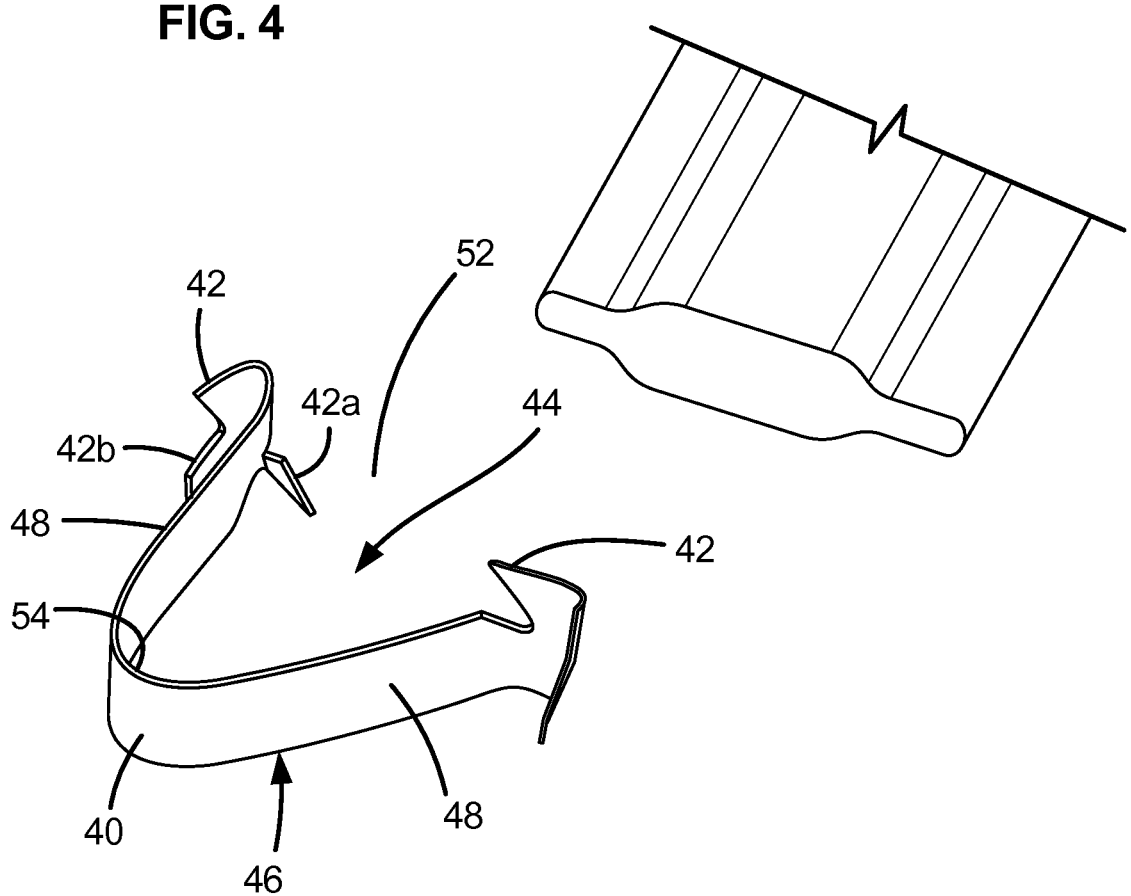
FIG. 4 is a perspective view of the seal retention clip of FIG. 3.

In the depicted example of FIG. 4, seal retention clip 40 includes a main body 46 including opposing legs 48 that are joined at an interconnection portion 50. The main body 46 defines the seal retention channel 44. The seal retention channel 44 has an open end 52 positioned opposite from a closed end 54. The closed end 54 is defined by the interconnect portion 50, which is curved, and the open end 52 is defined by free ends of the legs 48. Teeth 42 are provided at the free ends of the legs 48. The teeth can include inwardly projecting teeth 42a adapted to embed into the perimeter seal 38, and outwardly projecting teeth 42b are adapted to embed into the first shell 26. In the depicted example, the open end 52 of the main body 46 is inserted into the first groove 32 such that the closed end 54 passes over the perimeter seal 38 so as to retain the perimeter seal 38 within the first groove 32. The outwardly projecting teeth 42b embed into the first shell 26 to anchor the seal retention clip 40 within the first groove 32. In certain examples, the inner connect portion 50 of the seal retention clip 40 projects outwardly from the first groove 32 such that when the first and second shells 26, 28 are mated together, the open end 52 of the seal retention clip 40 is positioned within the first groove 32 and the closed end 54 of the seal retention clip 40 is positioned within the second groove 34.

Figure 5:
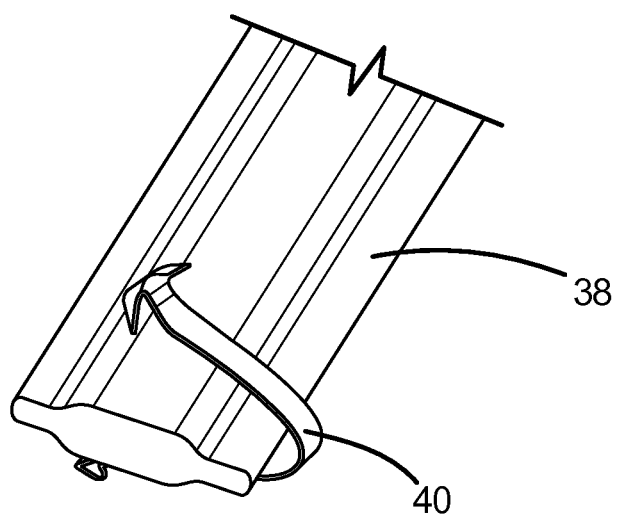
FIG. 5 is a perspective view of the seal retention clip of FIG. 4 with a perimeter seal received in a channel of the seal retention clip.
Figure 6:
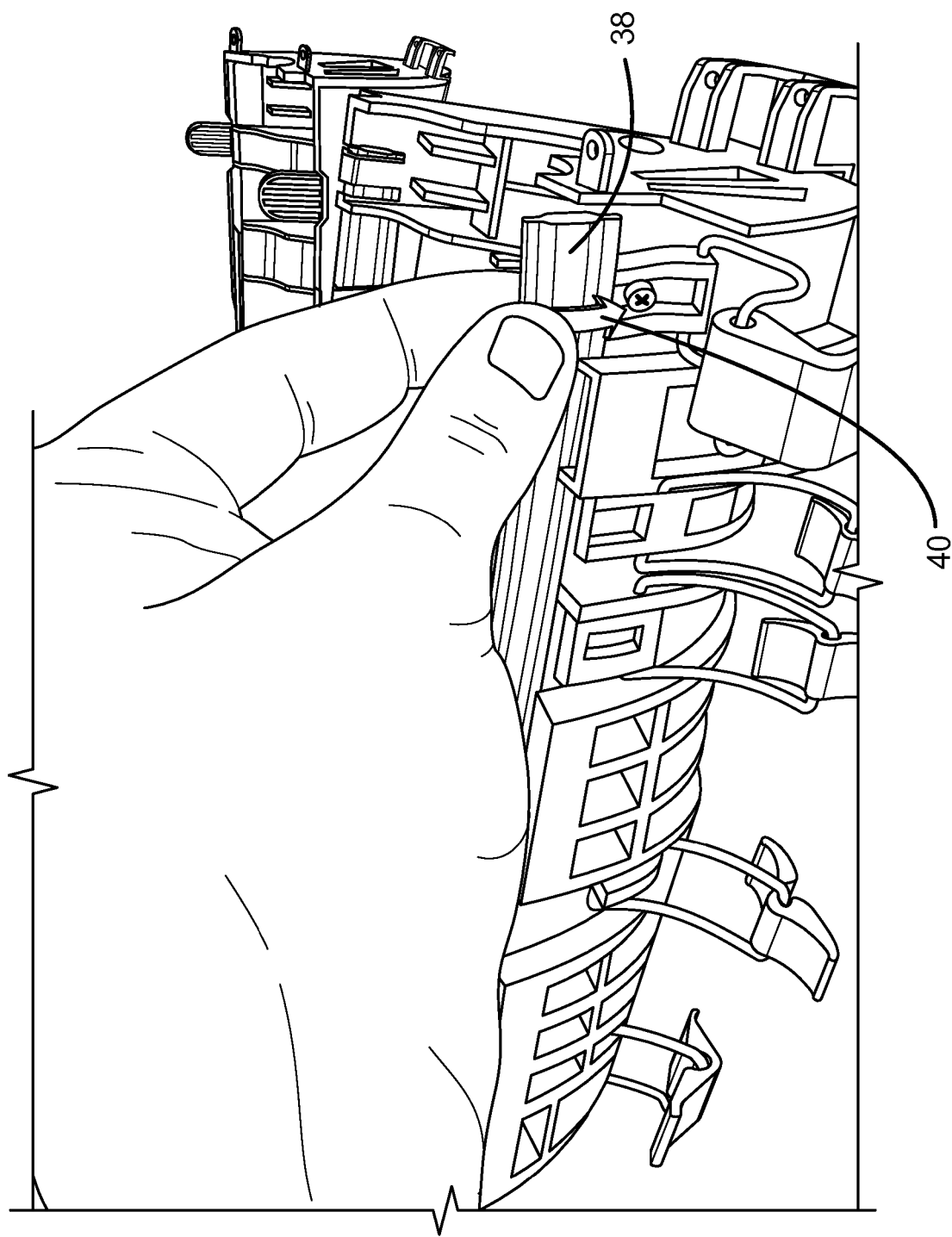
FIG. 6 shows the seal retention clip of FIG. 5 in the process of being loaded into a perimeter groove of the fiber optic enclosure.

FIG. 5 is another view showing the seal retention clip 40 mounted over one of the perimeter seals 38. FIG. 6 shows the seal retention clip 40 with the perimeter seal 38 secured therein in the process of being loaded into the first groove 32.

In certain examples, the teeth 42 can be pointed. In certain examples, the teeth 42 can have a generally triangular configuration.

Referring back to FIG. 1, the cable seals 36 include interior sides 56 that face the interior 22 of the fiber optic enclosure 20 and opposite exterior sides 58 that face outwardly from the fiber optic enclosure 20. The cable seals 38 also include peripheral portions 60 that extend between the interior and exterior sides 56, 58 and that are adapted to seal against inner surfaces of the housing 24 so as to provide circumferential sealing within the housing. In preferred examples, the perimeter seals 38 engage the peripheral portions 60 the cable seals 36 to maintain sealing integrity with respect to the interior 22 of the fiber optic enclosure 20.

In certain examples, cable seals 36 have a composition that includes gel. Example gels include oil-extended polymers. The polymer may, for example, include an elastomer, or a block copolymer having relative hard blocks and relatively elastomeric blocks. Example copolymers include styrene-butadiene or styrene-isoprene bi-block or tri-block copolymers. In still other examples, the polymer of the gel may include one or more styrene-ethylene-propylene-styrene block copolymers. Example extender oils used in example gels may, for example, include hydrocarbon oils, (e.g., paraffinic or naphthenic oils or polypropylene oils, or mixtures thereof). It will be appreciated that silicon gels can also be used. In certain examples, the perimeter seal 38 can include an extruded seal member. In certain examples, perimeter seal 38 can include a silicon composition.

Referring back to FIG. 1, the seal containment chambers 30, and thus the first and second grooves 32, 34, include first lengths 62 on interior sides of the cable seals 36 (i.e., the lengths that extend between the cable seals 36) and second lengths 64 on exterior sides of the cable seals 36 (i.e., the lengths that extend outwardly beyond the cable seals 36). In certain examples, the first lengths 62 are coaxially aligned with the second lengths 64. It is preferred for the seal retention clips 40 to be mounted within the first grooves 32 at positions along the second lengths 64 of the first grooves 32. In this way, the seal retention clips 40 do not compromise the sealing integrity provided with respect to the interior 22 of the fiber optic enclosure 20.

Figure 7:
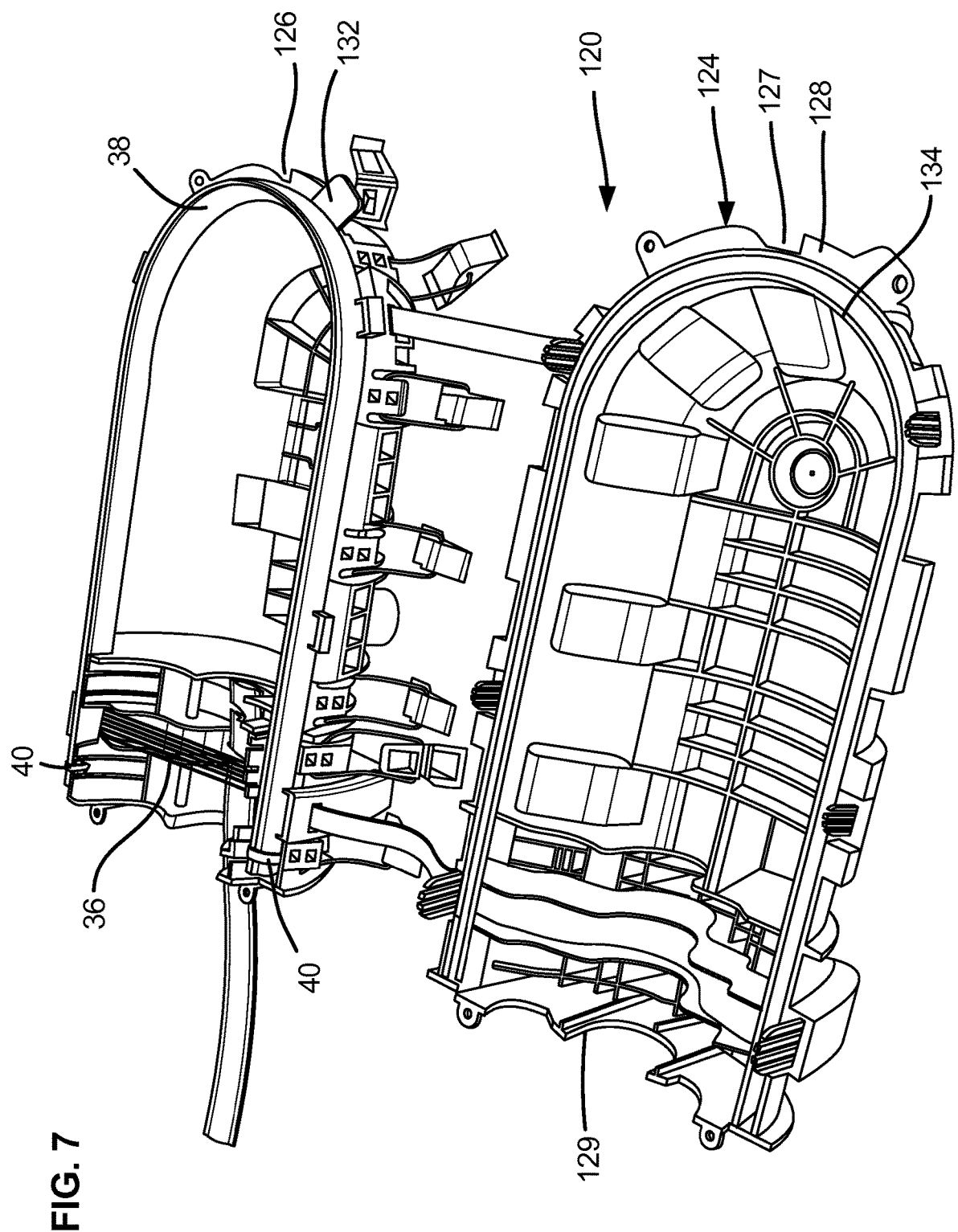
FIG. 7 shows another fiber optic enclosure in accordance with the principles of the present disclosure in an open configuration.

FIG. 7 shows an alternative enclosure 120 in accordance with the principles of the present disclosure. The fiber optic enclosure 120 includes a housing 124 including a first shell 126 and a second shell 128. The housing 124 is a butt-style housing having a closed end 127 positioned opposite from an end 129 at which a cable seal 36 is mounted. The first and second shells 126, 128 define a seal containment chamber 130 that extends continuously from the end 129 along one side of the housing 124, around the closed end 127 of the housing 124, and back along the opposite side of the housing 124 back to the end 129. The first and second shells 126, 128 can define first and second grooves 132, 134 which cooperate to define the seal containment chamber 130. Seal retention clips 40 can be used to secure the perimeter seal 38 within the first groove 132. The seal retention clips 40 can be positioned in portions of the first grooves 132 that are located exterior with respect to the cable seal 36.

Figure 9:
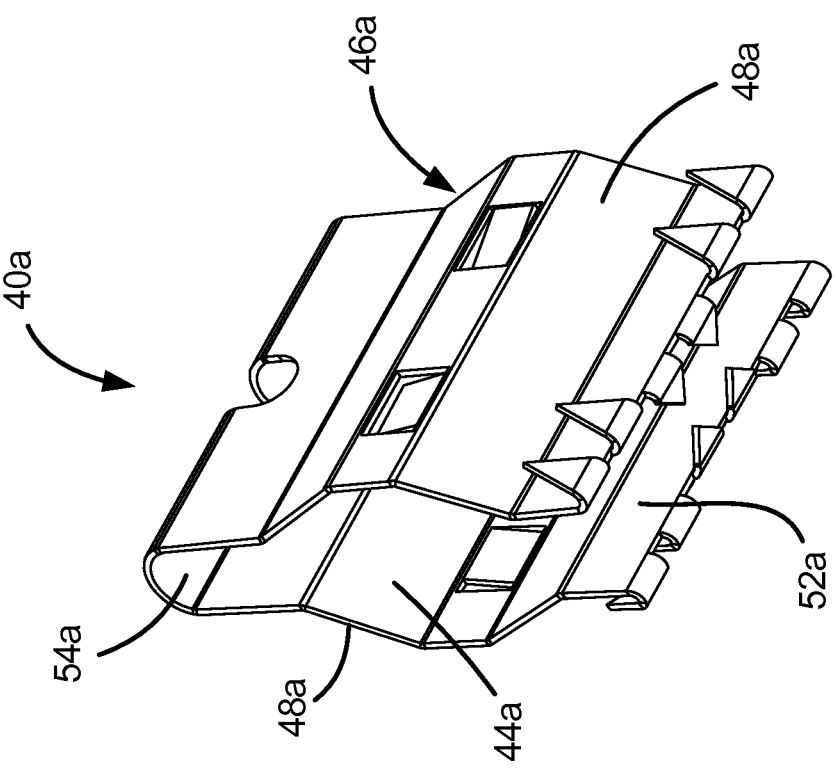
FIG. 9 is another perspective view of the seal retention clip of FIG. 8.
Figure 8:
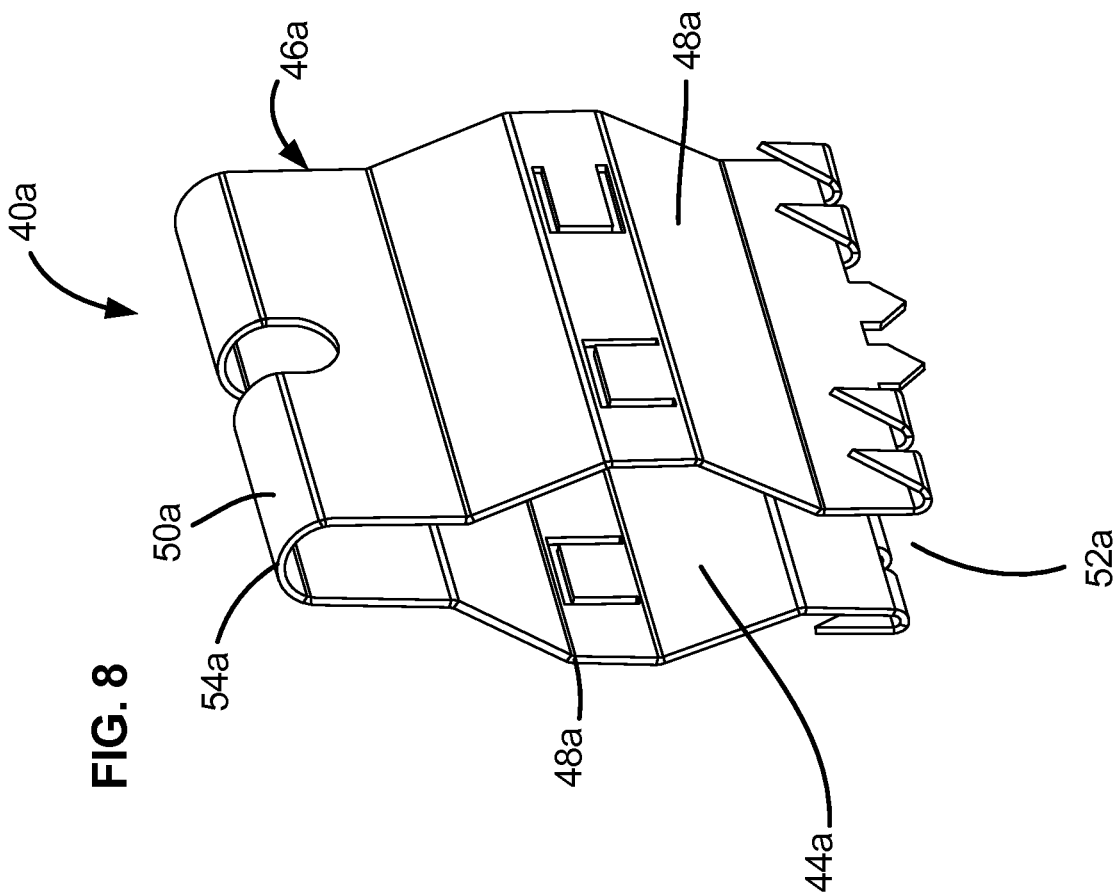
FIG. 8 is a perspective view of another seal retention clip in accordance with the principles of the present disclosure.
Figure 11:
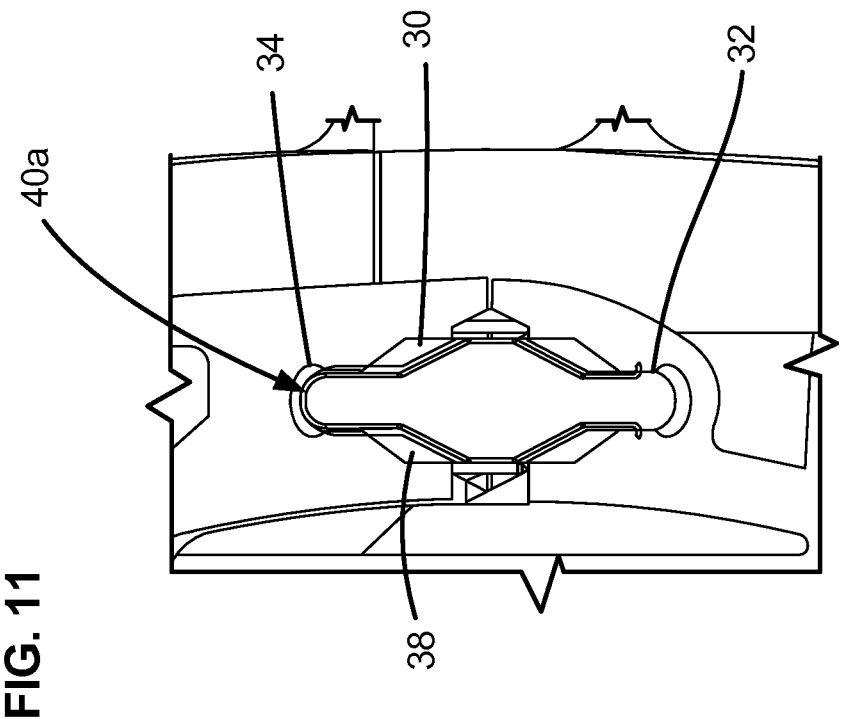
FIG. 11 shows the seal retention clip of FIG. 8 being used to retain a perimeter seal within a seal containment channel defined between two shells of the telecommunications enclosure.
Figure 10:
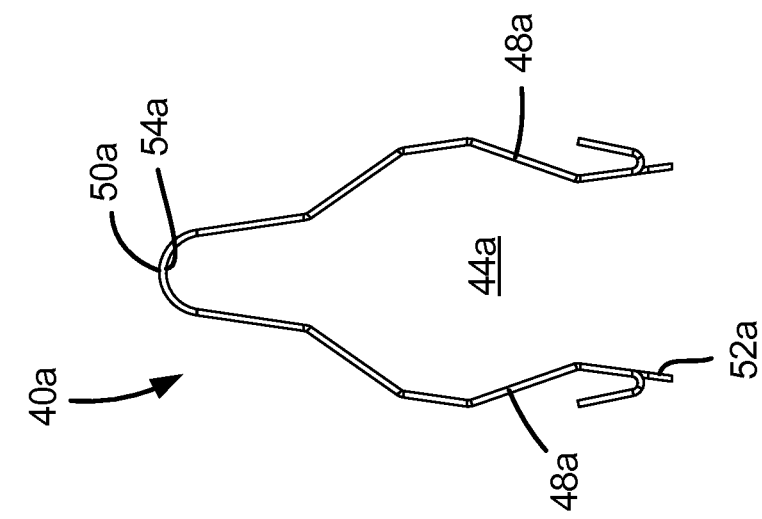
FIG. 10 is an end view of the seal retention clip of FIG. 8.

FIGS. 8-10 show another seal retention clip 40a in accordance with the principles of the present disclosure. Seal retention clip 40a is suitable for securing perimeter seals 38 in any of the enclosures 20, 120 disclosed herein. The seal retention clip 40a includes a main body 46a having legs 48a interconnected by an interconnect portion 50a. The main body 46a defines a seal retention channel 44a having an open end 42a and a closed end 54a. Interconnect portion 50a defines the closed end 54a. The seal retention clip 40a includes rectangular tabs that can flexed in to provide seal retention or can be flexed out to provide engagement with the housing. Similarly, the legs 40a include free ends at which pointed teeth are provided. The teeth can be bent into engage a perimeter seal contained within the seal retention chamber 44 or can be bent out to engage the housing when the seal retention clip 40a is mounted within a groove of the housing. FIG. 11 shows the seal retention clip 40a mounted within a seal containment chamber 30 along with a perimeter seal 38 that is positioned within the seal retention channel 44a. In certain implementations, the seal retention clip 40a is disposed within the seal containment chamber 30 at a location between the cable seal 36 and an exterior of the enclosure.

Figure 13:
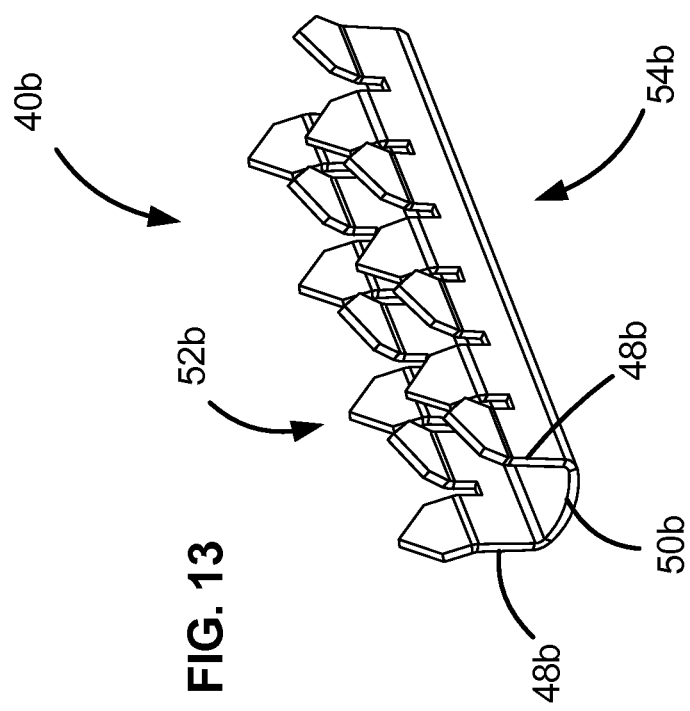
FIG. 13 is another view of the seal retention clip of FIG. 12 with retention teeth bent to a different configuration.
Figure 12:
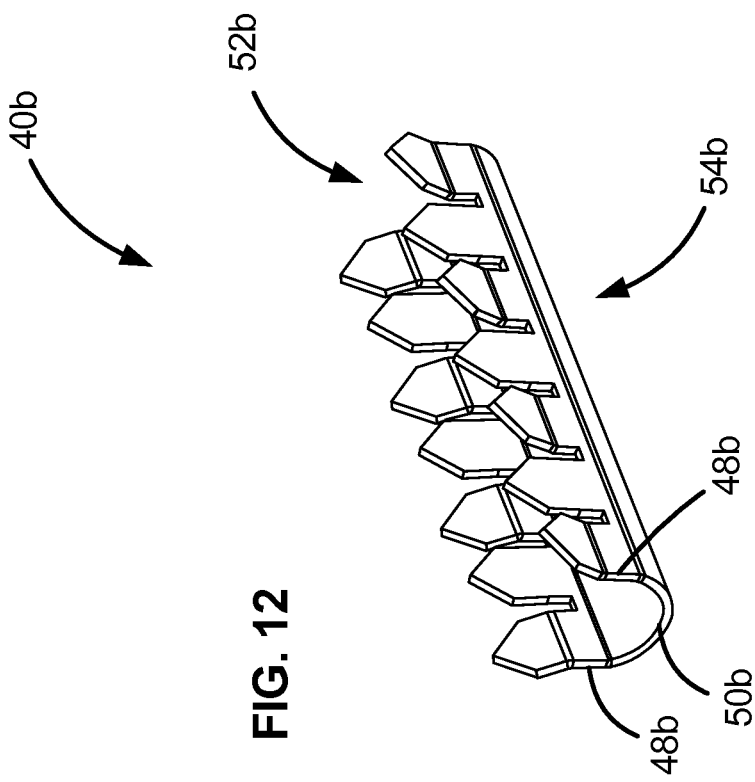
FIG. 12 shows another seal retention clip in accordance with the principles of the present disclosure.

FIGS. 12-14 show another seal retention clip 40b in accordance with the principles of the present disclosure. Seal retention clip 40b is suitable for securing perimeter seals 38 in any of the enclosures 20, 120 disclosed herein. The seal retention clip 40b defines a seal retention channel 44b. The seal retention clip 40b includes a main body 46b having legs 48b interconnected by an interconnect portion 50b. The seal retention channel 44b has an open end 42b and a closed end 54b. The closed end 52b is defined by the interconnect portion 50b and the open end 52 is defined by the free ends of the legs 48b. Pointed teeth are provided at the free ends of the legs 48b. Pointed teeth can be bent in toward the seal retention channel 44b to provide enhanced retention of the perimeter seal 38 within the seal retention channel 44. Selected ones of the pointed teeth can be bent out, away from the seal retention channel 44b so as to provide enhanced engagement (e.g., biting or embedding action) with respect to the housing 24 when the seal retention clip 40b is loaded into the first groove 32. FIG. 15 shows the seal retention clip 40b loaded into the first groove 32 of the first shell 26 with the perimeter seal 38 secured within the seal retention chamber 44b. In contrast to seal retention clips 40 and 40a, the closed end 54b of the main body 46b is inserted into the first groove 32 such that the closed end 54b passes under the perimeter seal 38. The perimeter seal 38 extends upwardly past the open end 52b of the seal retention clip 40b and out of the first groove 32. In certain examples, no portion of the seal retention clip 40b extends out of the first groove 32 to pass over the perimeter seal 38.

Figure 17:
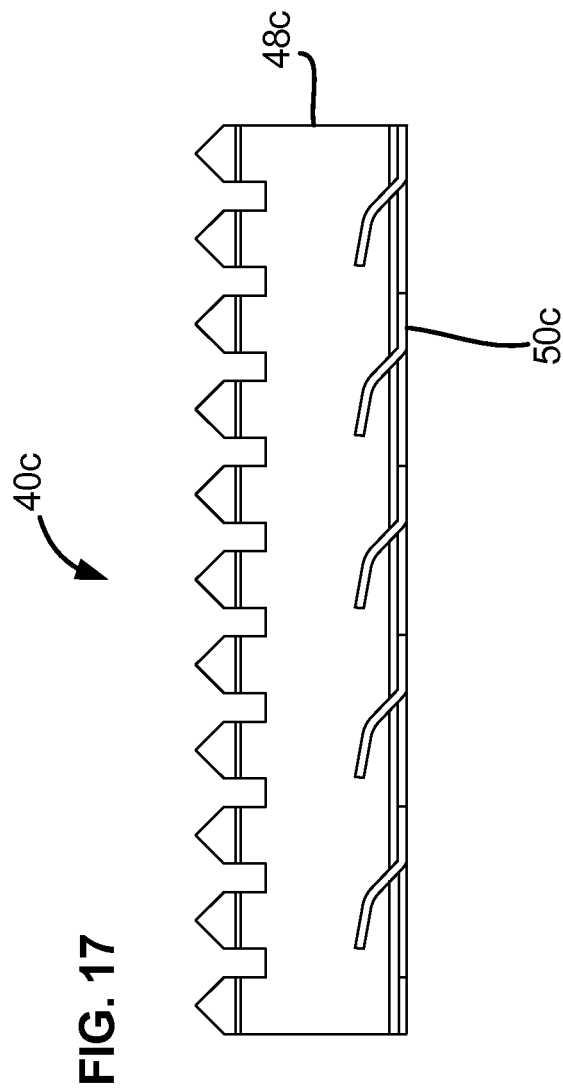
FIG. 17 is a cross-sectional view taken along section line 17-17 of FIG. 16.
Figure 16:
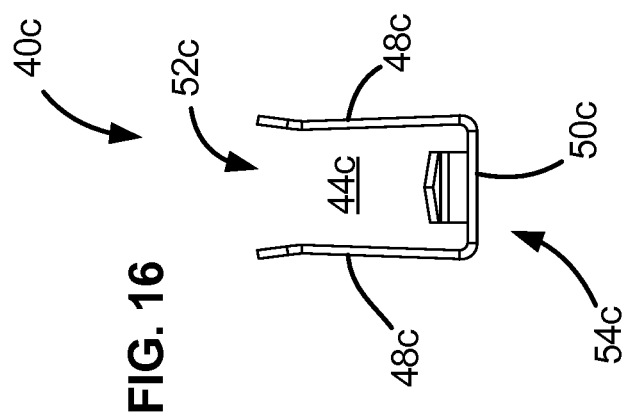
FIG. 16 is an end view of another seal retention clip in accordance with the principles of the present disclosure.
Figure 18:
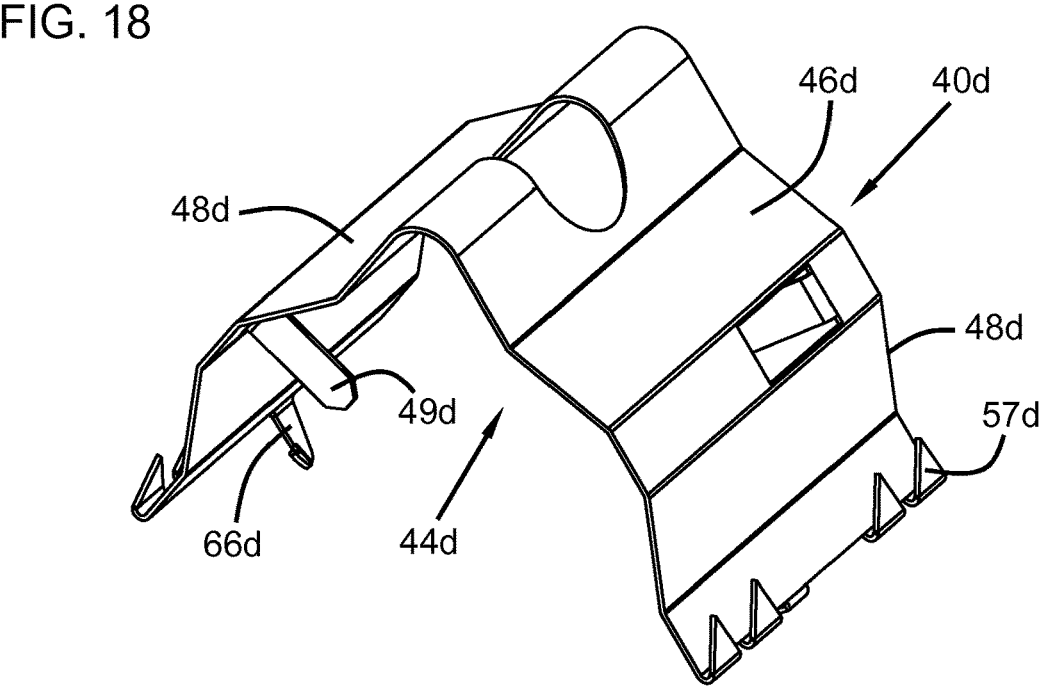
FIG. 18 is a first perspective view of another example seal retention clip in accordance with the principles of the present disclosure.
Figure 19:
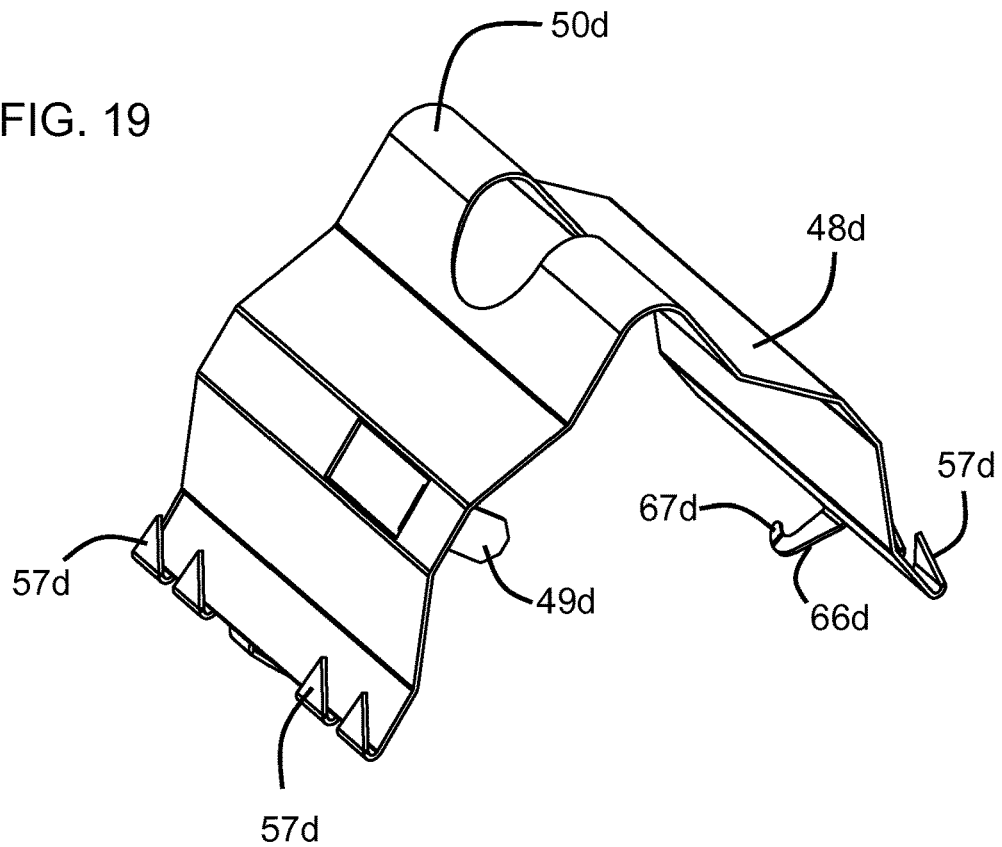
FIG. 19 is a second perspective view of the seal retention clip of FIG. 18.
Figure 20:
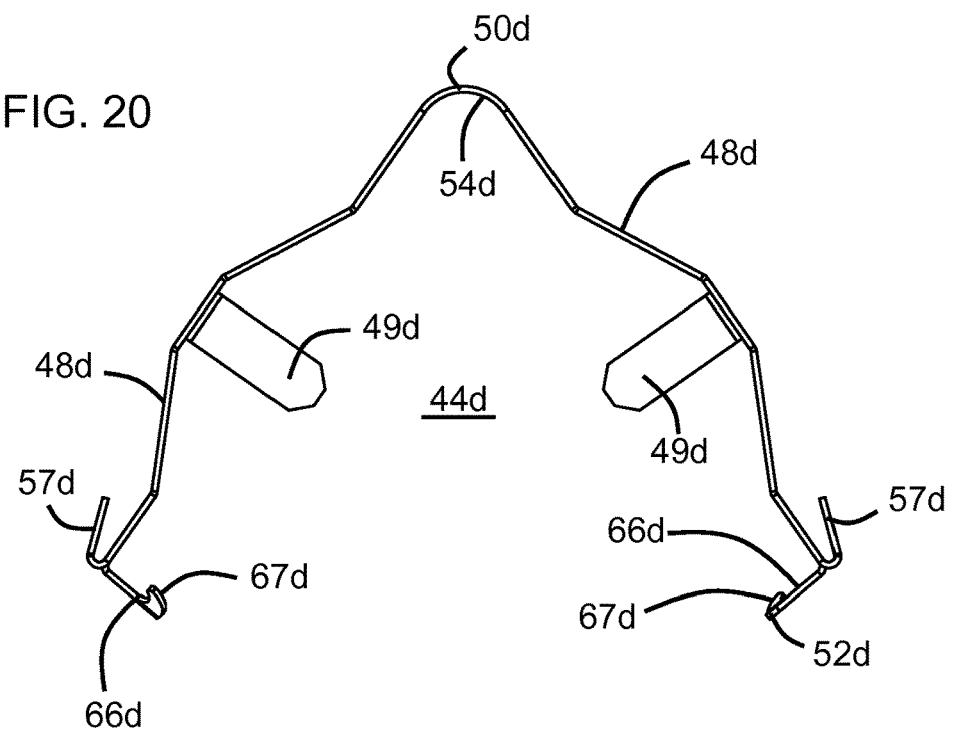
FIG. 20 is a side elevational view of the seal retention clip of FIG. 18.

FIGS. 16 and 17 show still another seal retention clip 40c in accordance with the principles of the present disclosure. Seal retention clip 40c is suitable for securing perimeter seals 38 in any of the enclosures 20, 120 disclosed herein. The seal retention clip 40c defines a seal retention channel 44c for receiving a perimeter seal 38. The seal retention clip 40c includes a main body 46c having legs 48c interconnected by an interconnect portion 50c. The seal retention chamber 44c has an open end 52c positioned opposite from a closed end 54c. Seal retention teeth are provided at the interconnect portion 50. The teeth can be pointed and are adapted to embed within the perimeter seal when the perimeter seal is mounted within the seal retention chamber 44c. Retention teeth are also provided at free ends of the legs 48c. Retention teeth can be pointed and can angled outwardly from the seal retention channel 44c so as to be able to bite into the material of the first shell 26 when the seal retention clip 40c is loaded into the first groove 32. The closed end 54c of the seal retention clip 40c is inserted into the first groove 32. The perimeter seal 38 extends upwardly past the open end 52c of the seal retention clip 40c and out of the first groove 32.

FIGS. 18-21 show another seal retention clip 40d in accordance with the principles of the present disclosure. Seal retention clip 40d is suitable for securing perimeter seals 38 in any of the enclosures 20, 120 disclosed herein. The seal retention clip 40d defines a seal retention channel 44d for receiving a perimeter seal 38. The seal retention clip 40d includes a main body 46d having legs 48d interconnected by an interconnect portion 50d. The seal retention clip 40d includes rectangular tabs 49d that can flexed in to provide seal retention or can be flexed out to provide engagement with the housing. When flexed in, the tabs 49d may embed within the perimeter seal 38 or press against an exterior of the perimeter seal 38.

When not mounted to the perimeter seal 38, the seal retention chamber 44d has an open end 52d positioned opposite from a closed end 54d. Retention teeth 57d are provided at free ends of the legs 48d. The retention teeth 57d can be pointed and can angled outwardly from the seal retention channel 44d so as to be able to bite into the material of the first shell 26 when the seal retention clip 40d is loaded into the first groove 32. The closed end 54d of the seal retention clip 40d is inserted into the first groove 32. The perimeter seal 38 extends upwardly past the open end 52d of the seal retention clip 40d and out of the first groove 32.

In certain implementations, the seal retention clip 40d includes a clasping arrangement 65d that secures the seal retention clip 40d to the perimeter seal 38. In certain examples, the clasping arrangement 65d closes the open end 52d of the seal retention chamber 44d. In an example, the clasping arrangement 65d is releasable to enable the seal retention chamber 44d to be reopened. In certain examples, the clasping arrangement 65d includes a component at the free end of each leg 48d that cooperate to retain the seal retention chamber 44d closed.

In some examples, the clasping arrangement 65d includes arms 66d extending outwardly from free ends of the legs 48d. In certain examples, a first arm 66d extends outwardly from a first of the legs 48d and a second arm 66d extends outwardly from a second of the legs 48d. The arms 66d extend at least partially towards each other. In certain examples, each arm 66d has a hooked end 67d.

When the perimeter seal 38 is positioned within the seal retention channel 44d, a first end of the perimeter seal 38 is pushed against the closed end 54d of the chamber 44d, the legs 48d are flexed over the sides of the perimeter seal 38 to bring the free ends of the legs 48d closer together, and the hooked ends 67d of the arms 66d are wrapped around the second end of the perimeter seal 38. In some examples, the hooked ends 67d extend into the perimeter seal 38. In other examples, the hooked ends 67d latch onto each other.

Figure 21:
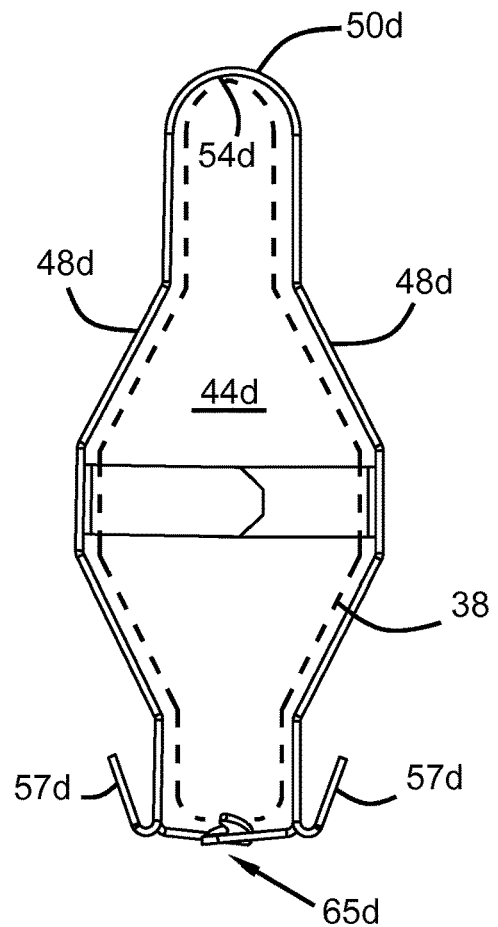
FIG. 21 is a side elevational view of the seal retention clip of FIG. 18 shown with the closure arrangement retaining the clip in a closed position.
Figure 22:
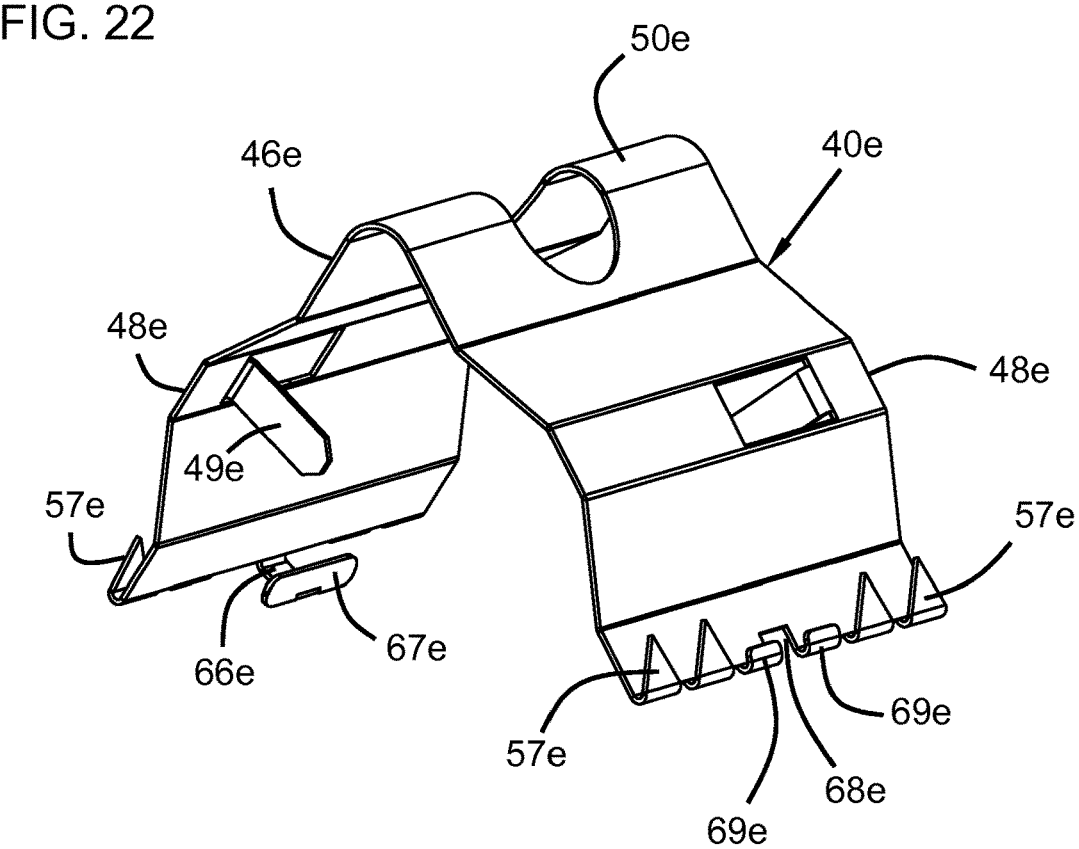
FIG. 22 is a first perspective view of another example seal retention clip in accordance with the principles of the present disclosure.
Figure 23:
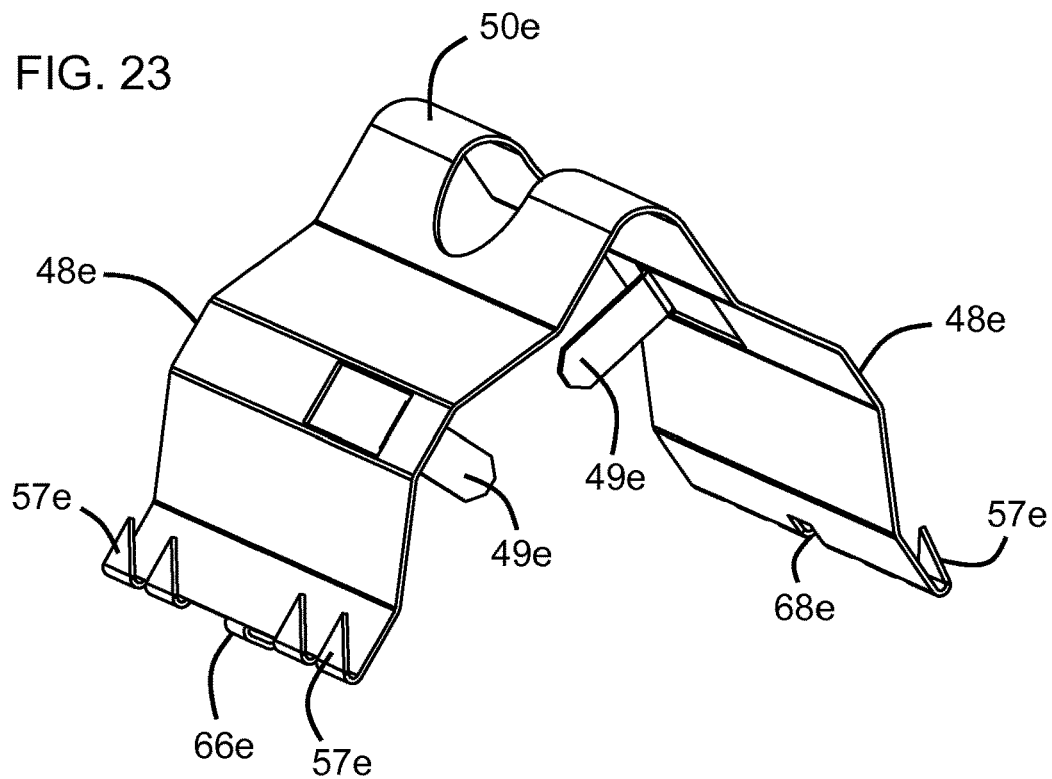
FIG. 23 is a second perspective view of the seal retention clip of FIG. 22.
Figure 24:
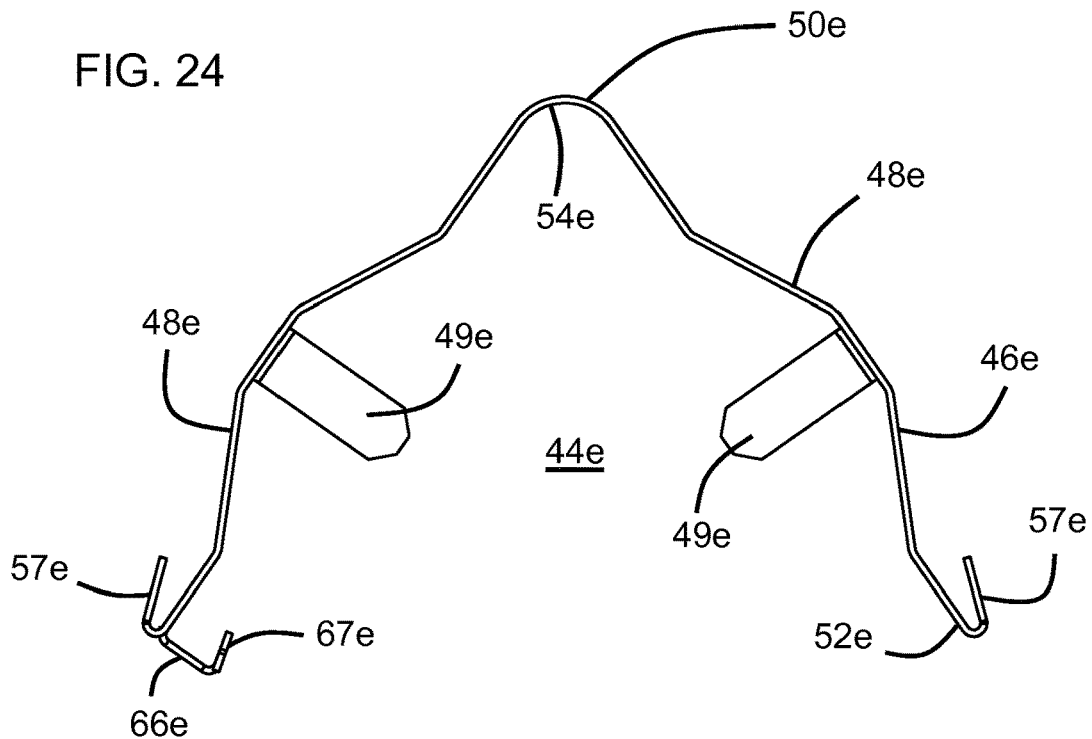
FIG. 24 is a side elevational view of the seal retention clip of FIG. 22.

In certain implementations, the legs 48d are shaped to conform generally to the profile shape of the perimeter seal 38. For example, FIG. 21 shows an outline in dashed lines of an example perimeter seal 38 disposed within the seal retention clip 40d held closed by the clasping arrangement 65d. In the example shown, the perimeter seal 38 has a wider middle portion narrowing at opposite ends. Accordingly, intermediate sections of the legs 48d of the seal retention clip 40d bow or angle outwardly. A first of the narrow ends is disposed at the closed end 54d of the seal retention chamber 44d. A second of the narrow ends is disposed at the clasping arrangement 65d holding the free ends of the legs 48d closed.

In certain implementations, the end of the perimeter seal 38 is notched or otherwise cut along a section that is disposed at the first grooves 32. For example, the perimeter seal 38 can be notched or cut at one of the narrow ends. The seal retention clip 40d is sized to fit around the notched or cut section of the perimeter seal 38. Accordingly, the seal retention clip 40d does not extend upwardly within the enclosure beyond the height of the perimeter seal 38. In some examples, the notched or cut section extends inwardly from a free end of the perimeter seal 38. In other examples, the notched or cut section is recessed inwardly from the free end of the perimeter seal 38.

FIGS. 22-25 show another seal retention clip 40e in accordance with the principles of the present disclosure. Seal retention clip 40e is suitable for securing perimeter seals 38 in any of the enclosures 20, 120 disclosed herein. The seal retention clip 40e defines a seal retention channel 44e for receiving a perimeter seal 38. The seal retention clip 40e includes a main body 46e having legs 48e interconnected by an interconnect portion 50e. The seal retention clip 40e includes rectangular tabs 49e that can flexed in to provide seal retention or can be flexed out to provide engagement with the housing. When flexed in, the tabs 49e may embed within the perimeter seal 38 or press against an exterior of the perimeter seal 38.

The seal retention chamber 44e has an open end 52e positioned opposite from a closed end 54e. Retention teeth 57e are provided at free ends of the legs 48e. The retention teeth 57e can be pointed and can angled outwardly from the seal retention channel 44e so as to be able to bite into the material of the first shell 26 when the seal retention clip 40e is loaded into the first groove 32. The closed end 54e of the seal retention clip 40e is inserted into the first groove 32. The perimeter seal 38 extends upwardly past the open end 52e of the seal retention clip 40e and out of the first groove 32.

In certain implementations, the seal retention clip 40e includes a clasping arrangement 65e that secures the seal retention clip 40e to the perimeter seal 38. In certain examples, the clasping arrangement 65e closes the open end 52e of the seal retention chamber 44e. In an example, the clasping arrangement 65e is releasable to enable the seal retention chamber 44e to be reopened. In certain examples, the clasping arrangement 65e includes a component at the free end of each leg 48e that cooperate to retain the seal retention chamber 44e closed.

In certain examples, the clasping arrangement 65e is a latching arrangement. In some examples, the clasping arrangement 65e includes a latch arm 66e extending outwardly from the free end of a first of the legs 48e. The latch arm 66e has a stop member 67e at a free end of the latch arm 66e. The clasping arrangement 65e also defines a notch 68e defined at the free end of a second of the legs 48e. The latch arm 66e is sized to fit within the notch 68e and the stop member 67e is sized larger than the notch 68e. Accordingly, the free ends of the legs 48e can be latched closed by inserting the latch arm 66e into the notch 68e with the stop member 67e disposed at an exterior of the second leg 48e (see FIG. 25). In certain examples, retention tabs 69e also are disposed at the free end of the second leg 48e to retain the stop member 67e, thereby holding the seal retention clip 40e in a closed position.

When the perimeter seal 38 is positioned within the seal retention channel 44e, a first end of the perimeter seal 38 is pushed against the closed end 54e of the chamber 44e, the legs 48e are flexed over the sides of the perimeter seal 38 to bring the free ends of the legs 48e closer together, and the closure arrangement 65e is closed around the second end of the perimeter seal 38. For example, the latch arm 66e can be slid into the notch 68e until the stop member 67e clears the retention tabs 69e. Then, the stop member 67e can be lowered onto the retention tabs 69e to hold the stop member 67e, thereby retaining the latch arm 66e in the notch 68e.

Figure 25:
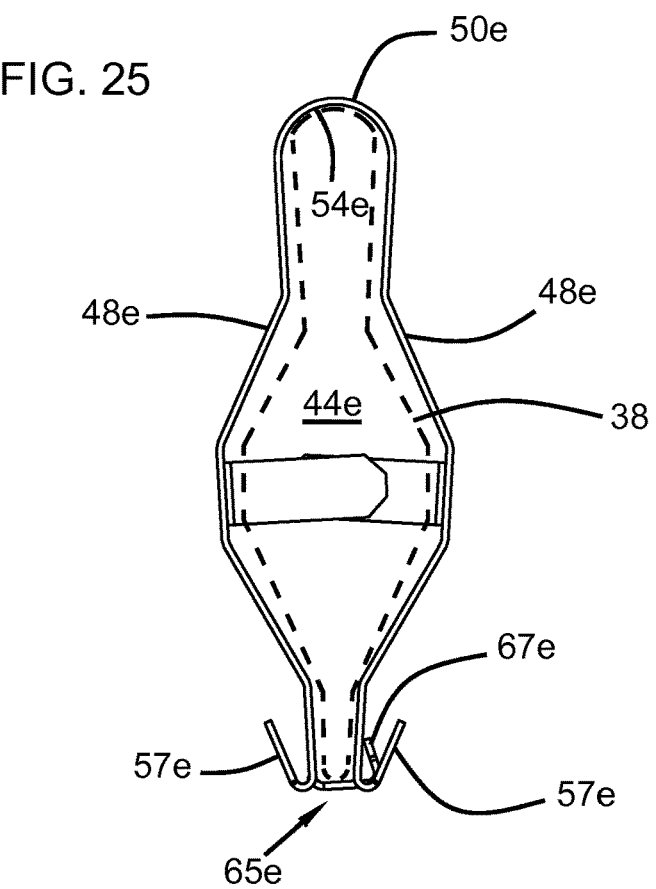
FIG. 25 is a side elevational view of the seal retention clip of FIG. 22 shown with the closure arrangement retaining the clip in a closed position.

In certain implementations, the legs 48e are shaped to conform generally to the profile shape of the perimeter seal 38. For example, FIG. 25 shows an outline in dashed lines of an example perimeter seal 38 disposed within the seal retention clip 40e held closed by the clasping arrangement 65e. In the example shown, the perimeter seal 38 has a wider middle portion narrowing at opposite ends. Accordingly, intermediate sections of the legs 48e of the seal retention clip 40e bow or angle outwardly. A first of the narrow ends is disposed at the closed end 54e of the seal retention chamber 44e. A second of the narrow ends is disposed at the clasping arrangement 65e holding the seal retention chamber 44e closed.

In certain implementations, the end of the perimeter seal 38 is notched or otherwise cut along a section that is disposed at the first grooves 32. For example, the perimeter seal 38 can be notched or cut at one of the narrow ends. The seal retention clip 40e is sized to fit around the notched or cut section of the perimeter seal 38. Accordingly, the seal retention clip 40e does not extend upwardly within the enclosure beyond the height of the perimeter seal 38. In some examples, the notched or cut section extends inwardly from a free end of the perimeter seal 38. In other examples, the notched or cut section is recessed inwardly from the free end of the perimeter seal 38.

What is claimed is:

1. A telecommunication enclosure comprising:
a housing including a first shell and a second shell that mate together to enclose an interior of the housing, the housing defining a seal containment channel that extends along a perimeter of the housing, the seal containment channel being defined by at least a first groove defined by the first shell;
a cable seal that mounts between the first and second shells;
the seal containment channel including a first length on an interior side of the cable seal and a second length on an exterior side of the cable seal;
a perimeter seal that mounts within the seal containment channel for sealing between the first and second shells;
fastening elements for securing the first and second shells together; and
a seal retention clip that mounts within at least the first groove for retaining the perimeter seal within the first groove when the first and second shells are separated from one another to open the housing, the seal retention clip being mounted within the seal containment channel at a position along the second length of the seal containment channel.

2. The telecommunications enclosure of claim 1, wherein the seal retention clip has a composition that includes metal.

3. The telecommunications enclosure of claim 1, wherein the seal retention clip has a resilient construction with elastic memory.

4. The telecommunications enclosure of claim 1, wherein the seal retention clip includes at least one shell retention portion for biting into a portion of the first shell which defines the first groove.

5. The telecommunications enclosure of claim 4, wherein the shell retention portion includes an outward projection from a main body of the seal retention clip.

6. The telecommunications enclosure of claim 5, wherein the outward projection includes a tab or a pointed tooth.

7. The telecommunications enclosure of claim 4, wherein the seal retention clip includes a plurality of the shell retention portions.

8. The telecommunications enclosure of claim 1, wherein the seal retention clip includes at least one seal retention portion for biting into the perimeter seal.

9. The telecommunications enclosure of claim 8, wherein the seal retention portion includes an inward projection from a main body of the seal retention clip.

10. The telecommunications enclosure of claim 9, wherein the inward projection includes a tab or a pointed tooth.

11. The telecommunications enclosure of claim 8, wherein the seal retention clip includes a plurality of the seal retention portions.

12. The telecommunications enclosure of claim 1, wherein the seal containment channel also is defined by a second groove defined by the second shell, the first and second grooves opposing each other when the first and second shells are mated together.

13. A telecommunications enclosure comprising:
a housing including a first shell and a second shell that mate together to enclose an interior of the housing, the housing defining a seal containment channel that extends along a perimeter of the housing, the seal containment channel being defined by at least a first groove defined by the first shell and a second groove defined by the second shell, the first and second grooves opposing each other when the first and second shells are mated together;
a cable seal that mounts between the first and second shells;
a perimeter seal that mounts within the seal containment channel for sealing between the first and second shells;
fastening elements for securing the first and second shells together; and
a seal retention clip that mounts within at least the first groove for retaining the perimeter seal within the first groove when the first and second shells are separated from one another to open the housing;
the seal retention clip including a portion received in the first groove and a portion received in the second groove when the first and second shells are mated together.

14. The telecommunications enclosure of claim 1, wherein the seal retention clip defines a seal retention channel for receiving the perimeter seal, the seal retention channel having an open end and a closed end.

15. A telecommunications enclosure comprising:
a housing including a first shell and a second shell that mate together to enclose an interior of the housing, the housing defining a seal containment channel that extends along a perimeter of the housing, the seal containment channel being defined by at least a first groove defined by the first shell;
a cable seal that mounts between the first and second shells;
a perimeter seal that mounts within the seal containment channel for sealing between the first and second shells;
fastening elements for securing the first and second shells together; and
a seal retention clip that mounts within at least the first groove for retaining the perimeter seal within the first groove when the first and second shells are separated from one another to open the housing;

the seal retention clip including a main clip body including first and second opposing legs joined by an interconnect section, the main clip body defining a seal retention channel for receiving the perimeter seal, the seal retention channel having an open end and a closed end, the closed end of the seal retention channel being defined by the interconnect section, and the open end of the seal retention channel being defined by free ends of the first and second legs.

16. A telecommunications enclosure comprising:
a housing including a first shell and a second shell that mate together to enclose an interior of the housing, the housing defining a seal containment channel that extends along a perimeter of the housing, the seal containment channel being defined by at least a first groove defined by the first shell;
a cable seal that mounts between the first and second shells;
a perimeter seal that mounts within the seal containment channel for sealing between the first and second shells;
fastening elements for securing the first and second shells together; and
a seal retention clip that mounts within at least the first groove for retaining the perimeter seal within the first groove when the first and second shells are separated from one another to open the housing;
the cable seal including an interior side that faces the interior of the housing and an opposite exterior side that faces outwardly from the housing, and wherein a portion of the perimeter seal contacts the cable seal to provide sealing therebetween.

17. The telecommunications enclosure of claim 1, wherein the seal retention clip includes a clasping arrangement that holds the seal retention clip to the perimeter seal.

18. A telecommunications enclosure comprising:
a housing including a first shell and a second shell that mate together to enclose an interior of the housing, the housing defining a seal containment channel that extends along a perimeter of the housing, the seal containment channel being defined by at least a first groove defined by the first shell;
a cable seal that mounts between the first and second shells;
a perimeter seal that mounts within the seal containment channel for sealing between the first and second shells;
fastening elements for securing the first and second shells together; and
a seal retention clip that mounts within at least the first groove for retaining the perimeter seal within the first groove when the first and second shells are separated from one another to open the housing, the seal retention clip including a clasping arrangement that holds the seal retention clip to the perimeter seal, the clasping arrangement including arms with hooked ends.

19. A telecommunications enclosure comprising: a housing including a first shell and a second shell that mate together to enclose an interior of the housing, the housing defining a seal containment channel that extends along a perimeter of the housing, the seal containment channel being defined by at least a first groove defined by the first shell:
a cable seal that mounts between the first and second shells;
a perimeter seal that mounts within the seal containment channel for sealing between the first and second shells;
fastening elements for securing the first and second shells together; and
a seal retention clip that mounts within at least the first groove for retaining the perimeter seal within the first groove when the first and second shells are separated from one another to open the housing, the seal retention clip including a clasping arrangement that holds the seal retention clip to the perimeter seal, the clasping arrangement including a latching arm and a notch.

20. The telecommunications enclosure of claim 19, wherein the clasping arrangement includes a retention tab adjacent the notch to hold the latching arm at the notch.

21. A telecommunications enclosure comprising:
a housing including a first shell and a second shell that mate together to enclose an interior of the housing, the housing defining a seal containment channel that extends along a perimeter of the housing, the seal containment channel being defined by at least a first groove defined by the first shell;
a cable seal that mounts between the first and second shells, wherein the cable seal has a composition that includes gel;
a perimeter seal that mounts within the seal containment channel for sealing between the first and second shells;
fastening elements for securing the first and second shells together; and
a seal retention clip that mounts within at least the first groove for retaining the perimeter seal within the first groove when the first and second shells are separated from one another to open the housing.

22. A telecommunications enclosure comprising:
a housing including a first shell and a second shell that mate together to enclose an interior of the housing, the housing defining a seal containment channel that extends along a perimeter of the housing, the seal containment channel being defined by at least a first groove defined by the first shell;
a cable seal that mounts between the first and second shells, wherein the perimeter seal has a composition that includes silicone;
a perimeter seal that mounts within the seal containment channel for sealing between the first and second shells;
fastening elements for securing the first and second shells together; and
a seal retention clip that mounts within at least the first groove for retaining the perimeter seal within the first groove when the first and second shells are separated from one another to open the housing.

23. The telecommunications enclosure of claim 16, wherein the seal containment channel includes a first length on an interior side of the cable seal and a second length on an exterior side of the cable seal, and wherein the seal retention clip is mounted within the seal containment channel at a position along the second length of the seal containment channel.

24. A telecommunications enclosure comprising:
a housing including a first shell and a second shell that mate together to enclose an interior of the housing, the housing defining a seal containment channel that extends along a perimeter of the housing, the seal containment channel being defined by at least a first groove defined by the first shell;
a cable seal that mounts between the first and second shells;
a perimeter seal that mounts within the seal containment channel for sealing between the first and second shells;
fastening elements for securing the first and second shells together; and a seal retention clip that mounts within at least the first groove for retaining the perimeter seal within the first groove when the first and second shells are separated from one another to open the housing;
the perimeter seal including a notched or cut section at which the seal retention clip is mounted.

25. The telecommunications enclosure of claim 1, wherein the seal retention clip has a profile that matches an outer profile of the perimeter seal.

26. The telecommunications enclosure of claim 1, wherein the seal retention clip mounts over the perimeter seal to retain the perimeter seal within the first groove.

\* \* \* \* \*